United States Patent

[11] 3,619,646

[72] Inventor Eric Andre Vittoz
Hauterive, Switzerland

[21] Appl. No. 875,680
[22] Filed Nov. 12, 1969
[45] Patented Nov. 9, 1971
[73] Assignee Centre Electronique Horloger SA
Neuchatel, Switzerland
[32] Priority Nov. 11, 1968
[33] Switzerland
[31] 16,822/68

[54] FREQUENCY DIVIDER CIRCUIT
8 Claims, 9 Drawing Figs.

[52] U.S. Cl. .......... 307/225, 307/205, 307/303
[51] Int. Cl. .......... H03k 21/00
[50] Field of Search .......... 307/220, 205, 225, 251, 279, 303, 304, 246; 328/39; 340/173

[56] References Cited

UNITED STATES PATENTS

| | | | |
|---|---|---|---|
| 3,267,295 | 8/1966 | Zuk .......... | 307/205 |
| 3,284,782 | 11/1966 | Burns .......... | 307/279 X |
| 3,363,115 | 1/1968 | Stephenson et al. .......... | 307/220 X |
| 3,383,570 | 5/1968 | Luscher .......... | 307/220 X |
| 3,515,901 | 6/1970 | White .......... | 307/251 X |

*Primary Examiner*—Stanley T. Krawczewicz
*Attorney*—Stevens, Davis, Miller & Mosher

ABSTRACT: A frequency divider circuit including at least one logical structure complying with the Boole Relations:
$A=\overline{\overline{B}I_1+AI_2}$ and $B=\overline{\overline{B}I_1+\overline{A}I_2}$
in which $I_1$ and $I_2$ are two complementary input quantities and $A$ and $B$ two output quantities.

The logical structure comprises three pairs of field effect transistors, such as MOS-transistors having isolated gates. A cascade of binary frequency divider circuits can be made as an integrated circuit.

FREQUENCY DIVIDER CIRCUIT

BACKGROUND OF THE INVENTION

Frequency division is generally obtained by multivibrators which, in order to function correctly, must be fed with input pulses offering certain qualifications, as for example a maximum growth time. From that fact, the operation of these circuits depends on the behavior of these input signals.

Efforts have been made to remedy this disadvantage by using, in the frequency divider circuit, logical circuits. These circuits are, however, complex.

OBJECT OF THE INVENTION

It is an object of this invention to simplify the known frequency divider circuits, and to provide such circuits which are reliable and can easily be made in the form of integrated circuits presenting a cascade of binary frequency divider circuits.

DEFINITION OF THE INVENTION

According to the present invention, a frequency divider circuit comprises at least one logical structure complying with the Boole relations:

$A=\overline{\bar{B}\,I_1+\bar{A}\,I_2}$ and $B=\overline{\bar{B}\,I_1+\bar{A}\,I_2}$ in which $I_1$ and $I_2$ are two complementary input quantities and $A$ and $B$ two output quantities.

Said logical structure comprises three pairs of field-effect transistors, each of them having a source, a drain and a gate, two outputs connected each to the drains of the two transistors of a first, respectively of a second pair, the sources of one transistor of the first and one transistor of the second pair being connected to the drain of a transistor of the third pair and the sources of the two other transistors of this first and second pair being connected to the drain of the other transistor of the third pair, or the four sources of the transistors of the two first pairs being connected together to the two drains of the transistors of the third pair, the two sources of the transistors of the third pair being connected together to one of the terminals of a tension source.

DESCRIPTION OF PREFERRED EMBODIMENTS

In the annexed drawing, the mathematical basis of the circuit and some preferred embodiments are shown.

A structure complying with the system of logical equations:

$A=\overline{\bar{B}\,I_1\bar{A}\,I_2}$ $B=\overline{\bar{B}\,I_1\bar{A}\,I_2}$ permits to divide by two the frequency of the input signals $I_1$ and $I_2$.

Figure 1:
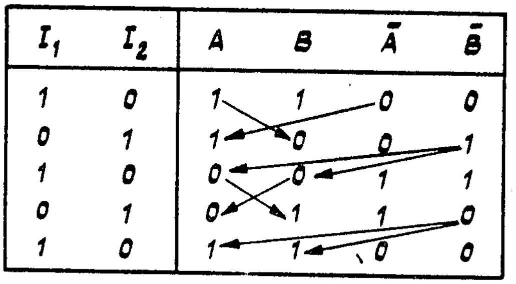
FIGS. 1 to 4 are diagrams explaining the mathematical basis on which the circuit is built.

Assuming that $I_2=\bar{I}_1$, we obtain the transition diagram of FIG. 1.

The arrows indicate the various implications. One can verify that the quantities implicating a given transition do not change their state during this transition.

Figure 2:
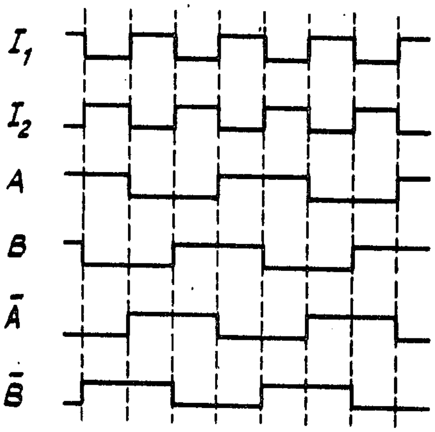

The variation frequency of each of the quantities $A$ and $B$ is half of $I_1$ and $I_2$, as is shown more clearly on FIG. 2.

Figure 3:
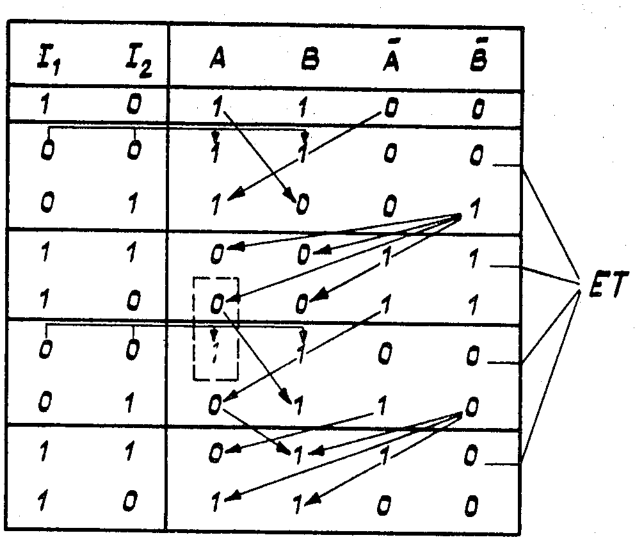

In reality, the showing of FIG. 1 is incomplete, because one has to take into account the transition times of $I_1$ and $I_2$, so short can they be. As $I_1$ and $I_2$ are practically obtained by inversion of one another, it can be seen that the transitions of one of these two quantities are slightly delayed compared to those of the other. By assuming that $I_2$ is obtained by the inversion of $I_1$, we obtain the transition diagram of FIG. 3.

The transition surrounded by a dotted line is forbidden, because it occurs on a quantity implicating the following state; therefore, it must not arise before $I_2$ has taken the value 1, by introducing a delay element. The transient states are represented on FIG. 3 by ET.

Figure 4:
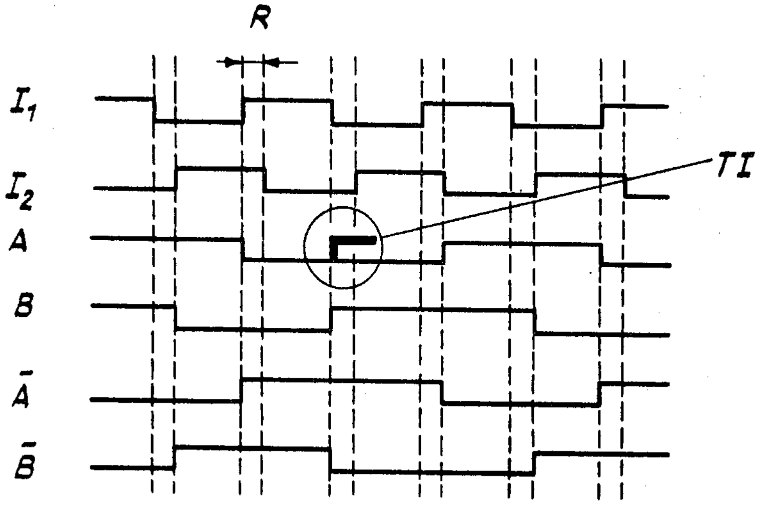

FIG. 4, which corresponds to FIG. 2, shows the logical values taken by the various signals, in course of time. R represents the delay, TI the forbidden transition.

In the case where $I_1$ is delayed compared to $I_2$, it can be seen that two transitions are forbidden, one from A, the other from B.

Figure 5:
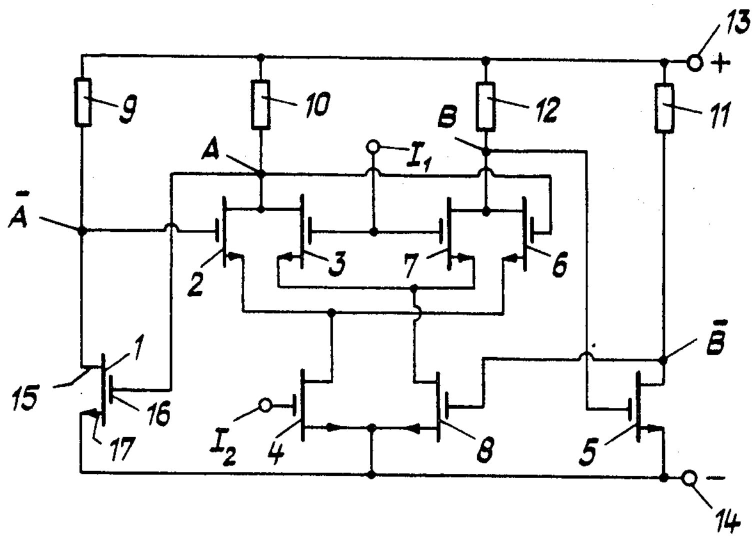
FIG. 5 shows an embodiment having MOST (i.e., a field-effect transistor having an isolated gate, also called IGFET) of the same type only.

FIG. 5 shows a first embodiment of a circuit with eight N-type MOST 1 to 8 working in enrichment mode, and four load resistors 9–12. Each MOST includes, as indicated for MOST 1 only, a drain 15, a gate 16 and a source 17. The drains of MOST 1 and 5 respectively are connected to load resistors 9 and 11 respectively, and to the gates of MOST 2 and 8 respectively. The drains of MOST 2 and 3, and 6 and 7 respectively are connected together to load resistors 10 and 12 respectively, and to the gates of MOST 1 and 5 respectively. The drains of MOST 4 and 8 are connected to the sources of MOST 2 and 6; and 3 and 7 respectively. Sources of MOST 1, 4, 5 and 8 are connected to the negative terminal of a voltage source (not shown), those of MOST 2 and 6 to the drain of MOST 4, and those of MOST 3 and 7 to the drain of MOST 8. The control signals $I_1$ and $I_2$ respectively are fed to the gates of MOST 3 and 7, and MOST 4 respectively. The signals A, B, $\bar{A}$, $\bar{B}$ appear at the terminals of the load resistors 10, 12, 9 and 11 respectively, opposite to those connected to the positive terminal 13 of the voltage source.

Figure 6:
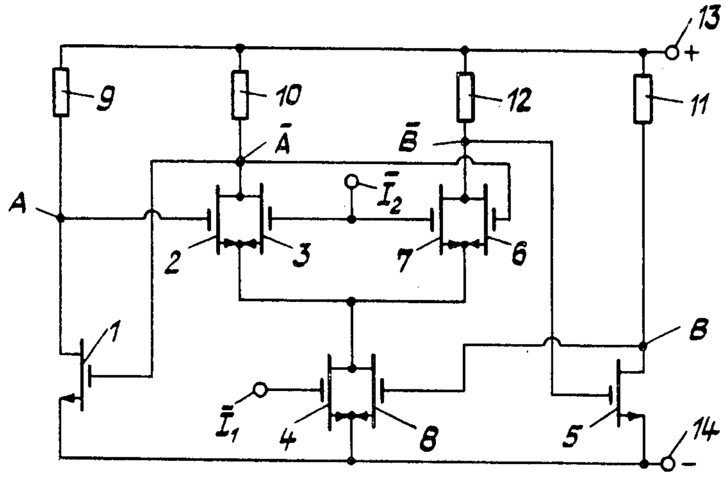
FIG. 6 shows a variant of the embodiment according to FIG. 5.

The circuit of FIG. 6 comprises the same elements as that of FIG. 5, but the sources of MOST 2, 3, 6 and 7 are all connected to the drains of MOST 4 and 8, themselves connected together, instead of the sources of MOST 2 and 6 being connected to the drain of MOST 4 and the sources of MOST 3 and 7 to the drain of MOST 8. As a result, the circuit of FIG. 6 is the duality of the one of FIG. 5, the states O and I, as well as the operations AND and OR being permutated.

It complies to the same equations as the circuit of FIG. 5. Indeed, we have.

$$\bar{A}=\overline{(A+\bar{I}_2)(B+\bar{I}_1)}=\overline{(A+\bar{I}_2)}+\overline{(B+\bar{I}_1)}=\bar{A}I_2+\bar{B}I_1$$

$$\bar{B}=\overline{(\bar{A}+\bar{I}_2)(B+\bar{I}_1)}=\overline{(\bar{A}+\bar{I}_2)}+\overline{(B+\bar{I}_1)}=AI_2+\bar{B}I_1$$

The circuits of FIGS. 5 and 6 comprise fewer elements than the classical logical division circuits. They are not critical: it is sufficient that the delay necessary for good operation exceeds a certain value.

In the two previous circuits, load resistors 9 to 12.

Figure 7:
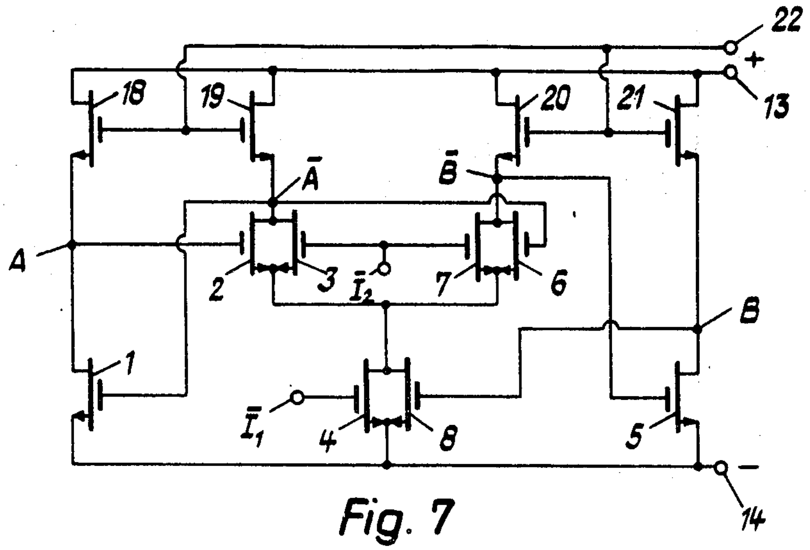
FIG. 7 shows a variant of the embodiment according to FIG. 6 which is derived from this latter by replacing load resistors by MOST.

In the two previous circuits, load resistors 9 to 12 can be replaced by MOST. The circuit on FIG. 6 is transformed, for example into that of FIG. 7. The four resistors 9 to 12 are replaced by four MOST 18 to 21, of which all the drains are connected to the positive terminal 13 of the voltage source, and of which all the gates are connected to a control terminal 22. By connecting terminal 22 to a source with short positive impulsions, the circuit works in "pulsed power" permitting considerable reduction in the average current consumed. MOST 18 to 21 conduct in fact only during the short impulsions; they are blocked during the intervals between the impulsions, the state of the circuit being then conserved by the "-parasitical" capacitances.

As to its manufacture, this circuit has the advantage of comprising MOST only, which facilitates its realization as an integrated circuit.

Figure 8:
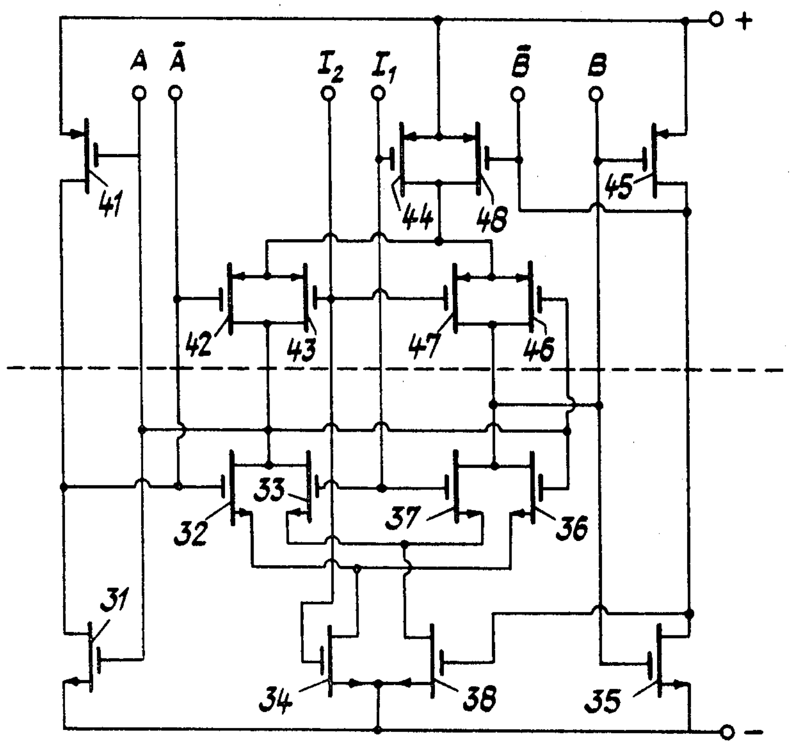
FIG. 8 shows an embodiment with complementary MOST and two logical circuits.

The circuit of FIG. 8 is realized with complementary MOST. It permits reduction in current to that necessary for loading the parasitical capacitances during the transitions. The consumption is then proportional to the working frequency. The circuit complies with the same equations as the above-mentioned ones.

The circuit of FIG. 8 comprises eight N-type MOST 31–38, and eight P-type MOST 41–48. The N-type MOST are located beneath the dotted line, and the P-type ones are above this line. The drains, sources and gates of MOST 31–38 are interconnected in the same way as those of the corresponding MOST 1–8 of FIG. 5, while the drains, sources and gates of MOST 41–48 are interconnected in the same way as those of the corresponding MOST of FIG. 6. Furthermore, the drains of MOST 31, 41; 32, 33, 42, 43; 36, 37, 46, 47; and 35, 45 respectively are connected together, as well as the gates of MOST 31, 41, 36, 46 ; 34, 43, 47 ; 33, 37, 44 ; 35, 45 ; and 32, 42 respectively. The input signals $I_1$ and $I_2$ are fed into the gates of MOST 33, 37, 44 and 34, 43, 47 respectively.

Figure 9:
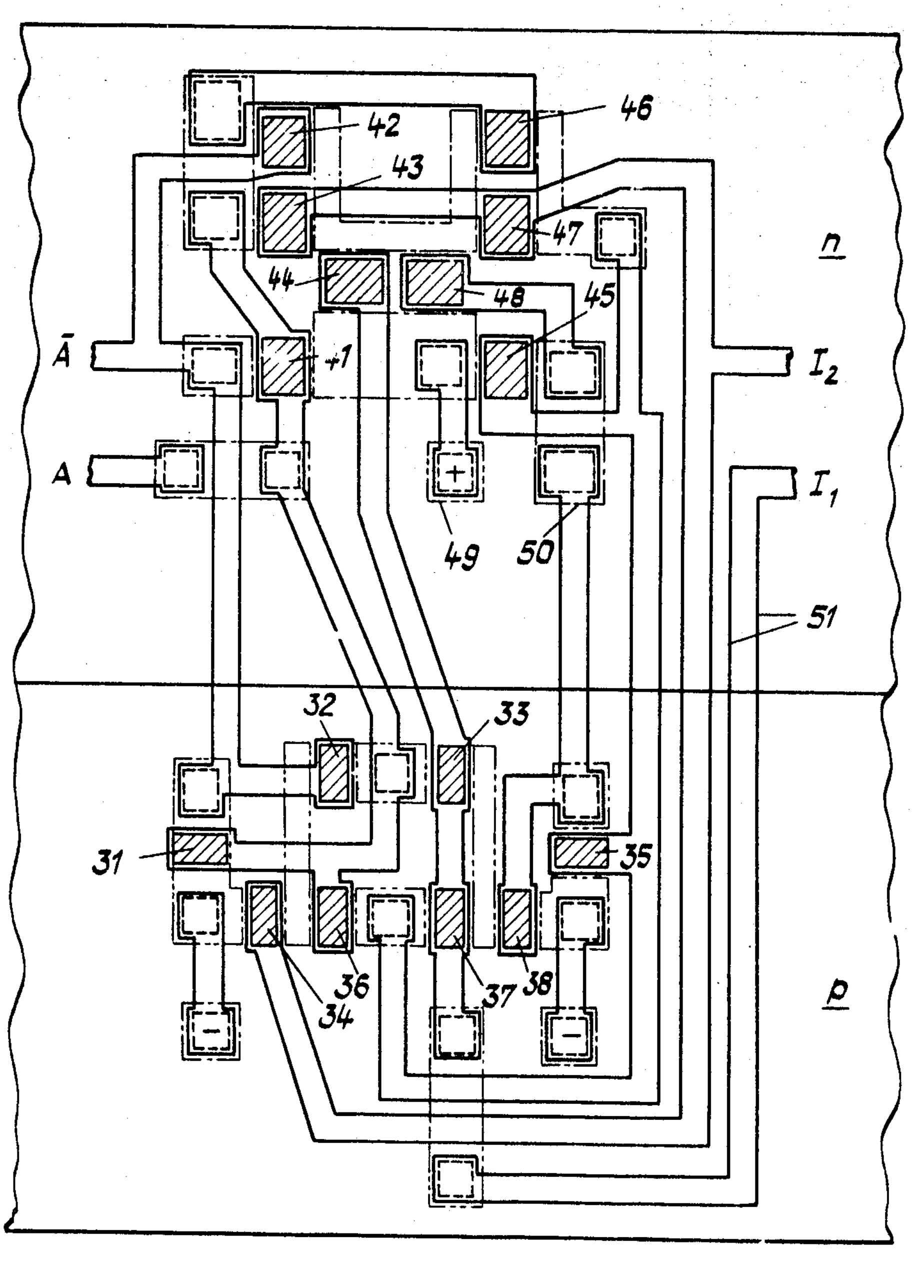

FIG. 9 shows an integrated embodiment of the circuit of FIG. 8. It has a substrate N-zone located above the median line, and a P-zone located beneath this line. The hachured zones 31 to 38 represent the gates of the N-type MOST, and the hachured zones 41 to 48 the gates of the P-type MOST.

The contacts of the drains and of the sources of the MOST are represented by N--%CCCC rectangles, while the $P^+$ islands are represented by mixed lines such as 49, and the $N^+$ islands are represented by mixed lines such B 50. The various connections are represented by the parallel lines 51.

The integrated circuit of FIG. 8 comprises in reality a cascade of binary divider circuits, but only one has been represented, the outputs A, $\bar{A}$ of one of these circuits being connected to the inputs $I_1$, $I_2$ of the following circuit of the cascade.

I claim:

1. A frequency divider circuit comprising at least one logical structure complying with the Boole relations:

$A=\bar{B}I_1+\bar{A}I_2$ and $B=\bar{B}I_1+AI_2$ in which $I_1$ and $I_2$ are two complementary input quantities, and $A$ and $B$ are two output quantities, said logical structure comprising first, second and third pairs of field-effect transistors, each of the transistors in said pairs having a source, a drain and a gate, the sources of one transistor of the first and one transistor of the second pair being connected together to the drain of one transistor of the third pair, and the sources of the two other transistors of the first and second pairs being connected to the drain of the other transistor of the third pair, the two sources of the transistors of the third pair being connected together to a terminal of a voltage source, the two drains of the transistor of the first pair being connected together and the two drains of the transistor of the second pair being connected together respectively, the outputs of said frequency divider circuit appearing at the drains of the transistors of said first and second pairs respectively.

2. A frequency divider circuit according to claim 1 further comprising first and second load resistors, each having one end coupled respectively to the drain of a transistor of said first and second pairs, the other ends of said load resistors being coupled to the other terminal of said voltage source.

3. A frequency divider circuit according to claim 1 further comprising a fourth pair of field-effect transistors, each transistor having one electrode coupled respectively to the drain of a transistor of said first and of said second pairs of field-effect transistors, the second electrodes of said fourth pair of field-effect transistor being coupled to the other terminal of said voltage source.

4. A frequency divider circuit according to claim 1, comprising two logical structures having common outputs, the transistors of the two logical structures being of inverse type.

5. A frequency divider circuit according to claim 4, including several binary stages with two logical structures each, in integrated form in a common substrate, the N-type transistor structures of all the stages being formed in a same P-type region of this substrate, and the P-type transistor structures of all the stages being formed in a same N-type region of this substrate.

6. A frequency divider circuit comprising at least one logical structure complying with the Boole relations:

$A=BI_1+AI_2$ and $B=BI_1+AI_2$ in which $I_1$ and $I_2$ are two complementary input quantities, and $A$ and $B$ are two output quantities, said logical structure comprising first, second and third pairs of field-effect transistors, each of the transistors in said pairs having a source, a drain and a gate, the four sources of the transistors of the two first pairs being connected together to the two drains of the third pair, the two sources of the transistors of the third pair being connected together to a terminal of a voltage source, the two drains of the transistor of the first pair being connected together and the two drains of the transistor of the second pair being connected together respectively, the outputs of said frequency divider circuit appearing at the drains of the transistors of said first and second pairs, respectively.

7. A frequency divider circuit according to claim 6 further comprising first and second load resistors, each having one end coupled respectively to the drain of a transistor of said first and second pairs, the other ends of said resistors being coupled to the other terminal of said voltage source.

8. A frequency divider circuit according to claim 6 further comprising a fourth pair of field-effect transistors, each transistor having one electrode coupled respectively to the drain of a transistor of said first and of said second pairs of field-effect transistors, the second electrodes of said fourth pair of field-effect transistor being coupled to the other terminal of said voltage source.

* * * * *

UNITED STATES PATENT OFFICE
CERTIFICATE OF CORRECTION

Patent No. 3,619,646 Dated November 9, 1971

Inventor(s) Eric Andre VITTOZ

It is certified that error appears in the above-identified patent and that said Letters Patent are hereby corrected as shown below:

IN THE ABSTRACT

Line 3, the Boole Relations should read:

-- $A = \overline{\bar{B}I_1 + \bar{A}I_2}$ and $B = \overline{\bar{B}I_1 + AI_2}$ --

IN THE SPECIFICATION

Column 1, line 25; Column 1, line 60; Column 3, line 33; and Column 4, line 24; the Boole relations should read -- $A = \overline{\bar{B}I_1 + \bar{A}I_2}$ and $B = \overline{\bar{B}I_1 + \bar{A}I_2}$ --

Column 2, line 52, is cancelled.

Column 3, line 21, replace "N--%CCCC" by -- dotted --.

Column 3, line 23, replace "B" by -- as --.

Signed and sealed this 18th day of June 1974.

(SEAL)
Attest:

EDWARD M.FLETCHER, JR.
Attesting Officer

C. MARSHALL DANN
Commissioner of Patents